United States Patent [19]
Stebnicki

[11] Patent Number: 5,573,106
[45] Date of Patent: Nov. 12, 1996

[54] MODULAR CONVEYOR CHAIN INCLUDING HEADED HINGE PINS

[75] Inventor: James C. Stebnicki, Whitefish Bay, Wis.

[73] Assignee: Rexnord Corporation, Milwaukee, Wis.

[21] Appl. No.: 596,455

[22] Filed: Feb. 5, 1996

[51] Int. Cl.$^6$ ................................................. B65G 17/06
[52] U.S. Cl. ........................................ 198/853; 198/850
[58] Field of Search .................................. 198/850, 851, 198/852, 853

[56] References Cited

U.S. PATENT DOCUMENTS

| | | | |
|---|---|---|---|
| 4,729,469 | 3/1988 | Lapeyre et al. | 198/853 X |
| 4,765,454 | 8/1988 | Hodlewsky et al. | 198/853 X |
| 4,858,753 | 8/1989 | Hodlewsky | 198/853 |
| 4,949,838 | 8/1990 | Lapeyre et al. | 198/853 |
| 4,972,942 | 11/1990 | Faulkner | 198/853 |
| 5,020,656 | 6/1991 | Faulkner | 198/494 |
| 5,058,732 | 10/1991 | Lapeyre | 198/853 |
| 5,105,938 | 4/1992 | Tan | 198/853 |
| 5,156,262 | 10/1992 | Horton | 198/834 |
| 5,156,264 | 10/1992 | Lapeyre | 198/852 |
| 5,332,084 | 7/1994 | Greve | 198/853 |
| 5,482,156 | 1/1996 | Damkjaer | 198/853 |

Primary Examiner—James R. Bidwell
Attorney, Agent, or Firm—Michael, Best & Friedrich

[57] ABSTRACT

Disclosed herein is a conveyor comprising a first conveyor element including a series of eyes spaced from each other, defining therebetween a series of spaces, and including a sub-series of centrally located eyes respectively including therein openings aligned with respect to each other, and an end eye adjacent one end of the sub-series of centrally located eyes and including therein an opening located in partial registry with the openings of the sub-series of centrally located eyes, and an abutment area adjacent the opening in the end eye, a second conveyor element fabricated of resilient material and including a series of eyes spaced from each other, extending into the spaces between the eyes of the first conveyor element.

18 Claims, 2 Drawing Sheets

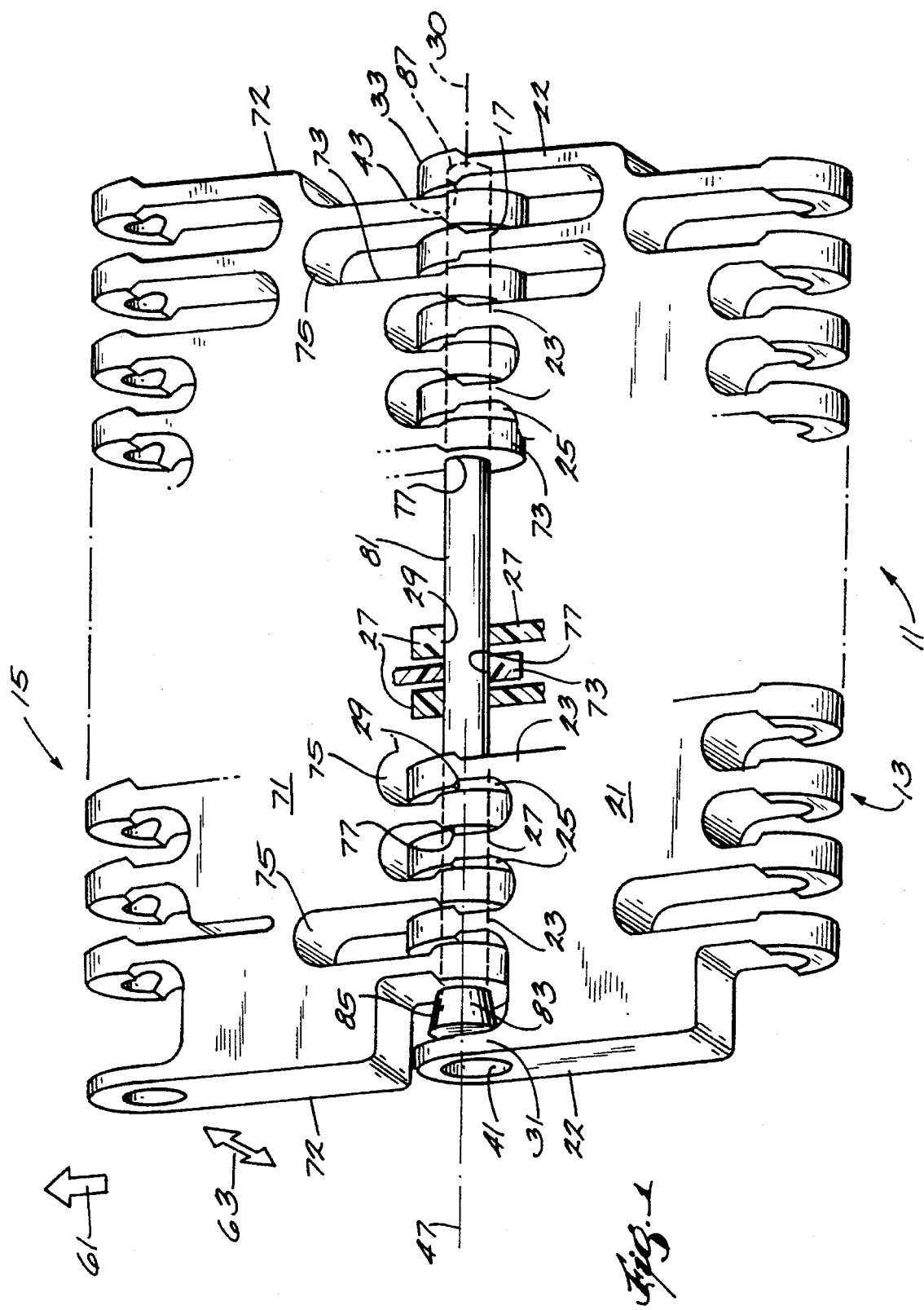

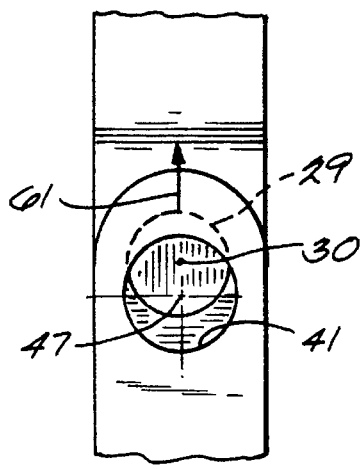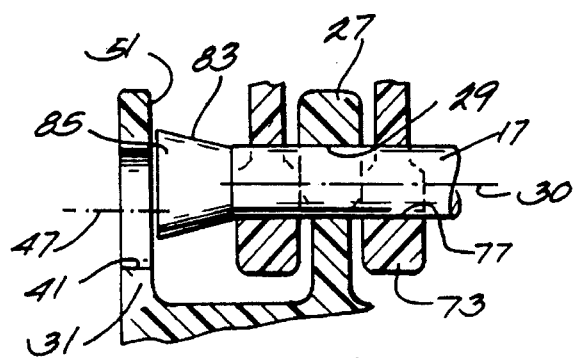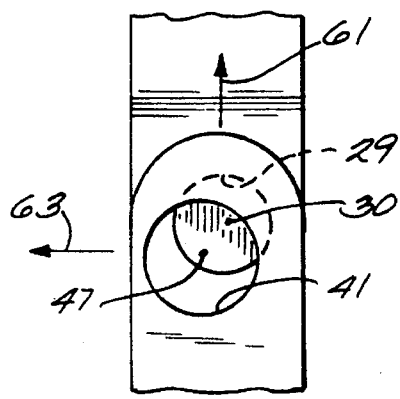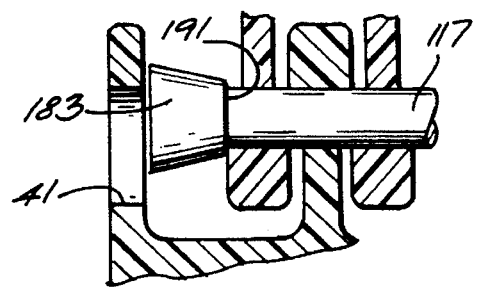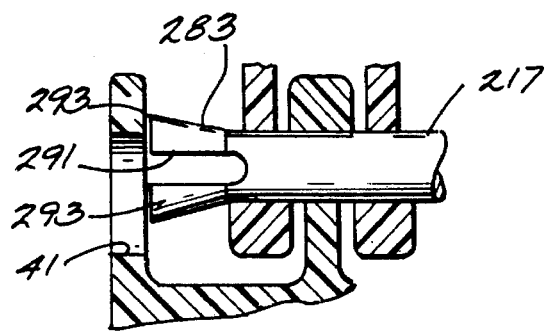

5,573,106

MODULAR CONVEYOR CHAIN INCLUDING HEADED HINGE PINS

BACKGROUND OF THE INVENTION

The invention relates generally to belt, chain, or conveyor construction, and, in particular, to systems or arrangements for preventing unwanted axial migration of a hinge pin connecting two adjacent belt, chain, or conveyor elements.

More specifically, the axial loads on a hinge pin in a belt, chain, or conveyor are such that a hinge pin retention system is needed to prevent the hinge pin from axially migrating and forcing its way out of engagement with the axially adjacent elements of the belt, chain, or conveyor.

In the past, plugs, or headed pins, or hooded link extensions have been employed to prevent axial hinge pin movement.

Attention is directed to the following U.S. Pat. Nos.:

4,858,753, issued Aug. 22, 1989

4,949,838, issued Aug. 21, 1990

4,972,942, issued Nov. 27, 1990

5,020,656, issued Jun. 4, 1991

5,058,732, issued Sep. 20, 1990

5,105,938, issued Apr. 21, 1992

5,156,262, issued Oct. 20, 1992

5,156,264, issued Oct. 20, 1992

5,332,084, issued Jun. 26, 1994

SUMMARY OF THE INVENTION

The invention provides a conveyor comprising a first conveyor element including a series of eyes spaced from each other, defining therebetween a series of spaces, and including a sub-series of centrally located eyes respectively including therein openings aligned with respect to each other, and an end eye adjacent one end of the sub-series of centrally located eyes and including therein an opening located in partial registry with the openings of the sub-series of centrally located eyes, and an abutment area adjacent the opening in the end eye, a second conveyor element fabricated of resilient material and including a series of eyes spaced from each other, extending into the spaces between the eyes of the first conveyor element, defining therebetween a series of spaces receiving the eyes of the central sub-series of eyes of the first conveyor element, and respectively including therein openings aligned with respect to each other and with respect to the openings of the centrally located sub-series of eyes, and having a dimension, and a hinge pin including a central portion extending in the openings of the sub-series of centrally located eyes of the first conveyor element and in the openings of the eyes of the second conveyor element, and an enlarged end portion located between the end eye of the first conveyor element and the eyes of the second conveyor element and in interfering alignment with the abutment area of the end eye of the first conveyor element and having a dimension greater than the dimension of the openings of the eyes of the second conveyor element.

The invention also provides a conveyor as set forth in the previous paragraph wherein the opening in the end eye of the first conveyor element has a dimension, and wherein the enlarged end portion has a dimension greater than the dimension of the openings in the eyes of the second conveyer element and lesser than the dimension of the opening in the end eye of first conveyer element.

The invention also provides a conveyor comprising a first conveyor element fabricated of resilient material and including an end comprising a series of eyes spaced from each other, defining therebetween a series of spaces, and including a sub-series of centrally located eyes spaced from each other at a given distance and respectively including therein openings aligned with respect to each other and having a dimension, and an end eye located adjacent one end of the sub-series of centrally located eyes and in axially spaced relation thereto at a distance approximately equal to three times the axial given distance between adjacent eyes of the sub-series of centrally located eyes and including therein an opening located in partial registry with the openings of the sub-series of centrally located eyes and having a dimension greater than the dimension of the opening in the end eye of the first conveyor element, and an abutment area located adjacent the opening of the end eye, a second conveyor element including an end comprising a series of eyes spaced from each other, extending into the spaces between the eyes of the first conveyor element, defining therebetween a series of spaces receiving the eyes of the central sub-series of the eyes of the first conveyor element, and including an end eye, and openings located in each of the series of eyes of the second conveyor element, being aligned with respect to each other, and having a dimension substantially equal to the dimension of the opening in the end eye of the first conveyor element, and a hinge pin fabricated of resilient material, having an axial length less than the axial spacing between the end eye of the second conveyor element and the end eye of the first conveyor element and including a central portion extending in the openings of the sub-series of centrally located eyes of the first conveyor element and in the openings of the eyes of the second conveyor element, and an enlarged end portion located between the end eye of the first conveyor element and the end eye of the second conveyor element and the enlarged end portion having an inner end located adjacent the central portion and having a dimension greater than the dimension of the openings of the eyes of the second conveyor element, and an outer end located remotely from the central portion and located in interfering alignment with the abutment area of the end eye of the first conveyor element.

Other features and advantages of the invention will become apparent to those skilled in the art upon review of the following detailed description, claims and drawings.

DESCRIPTION OF THE DRAWINGS

FIG. 1 is a fragmentary perspective view, partially broken away and in section, of a conveyor embodying various of the features of the invention.

FIG. 2 is a fragmentary sectional view of a portion of the conveyor shown in FIG. 1.

FIG. 3 is a fragmentary end view of the conveyor shown in FIG. 1.

FIG. 4 is a fragmentary end view which is similar to FIG. 3 and which illustrates a further embodiment of the invention.

FIG. 5 is a fragmentary view which is similar to FIG. 2 and which illustrates a further embodiment of the invention.

FIG. 6 is a fragmentary view which is similar to FIG. 2 and which illustrates still another embodiment of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIG. 1 is a track assembly, or chain, or belt, or conveyer 11 which comprises first and second elements or belts or tracks or links 13 and 15, respectively, and a hinge pin 17 pivotally connecting the first and second conveyor elements or links 13 and 15. The invention is applicable to any type of track assembly, chain, belt, or conveyor, and, except as noted hereinafter, the conveyor elements can take any conventional form and can be fabricated of any suitable material.

The first conveyor element 13 can be fabricated of any suitable plastic or other material which is preferably resiliently flexible and includes laterally spaced and generally rectilinearly extending sides 22, together with a first end 21 located between the sides 22 and comprising a first series of eyes 23 which are spaced from each other, which define therebetween a series of spaces 25, and which include a sub-series of centrally located eyes 27 respectively including therein openings or holes 29 aligned with respect to each other along an axis 30 and having a given diameter or dimension. Preferably, the openings or holes 29 are cylindrical, have a common axis 30, and have a common diameter.

The end 21 of the first conveyor element or link 13 also includes a first end eye 31 adjacently spaced from one end of the sub-series of centrally located eyes 27 and a second end eye 33 adjacently spaced from the other end of the sub-series of centrally located eyes 27.

In the preferred construction, the first end eye 31 is spaced from the adjacent eye of the sub-series of centrally located eyes 27 at a distance of approximately three times the axial length of the individual spaces 25 between the eyes 27 of the sub-series of centrally located eyes 27. In other constructions, the first end eye can be spaced sufficiently to provide access to the pin end for inspection and removal with standard tools, i.e., needle nose pliers or a screwdriver.

The end eye 33 is spaced from the adjacent eye of the sub-series of centrally located eyes 27 at a distance which is approximately equal to the axial length of the spaces 25 between the eyes 27 of the centrally located sub-series of eyes. The end eyes 31 and 33 include therein respective openings or holes 41 and 43 which are generally cylindrical in shape.

The opening 41 in the end eye 31 has a diameter greater than the diameter of the openings 29 in the eyes 27 of the sub-series of centrally located eyes and has an axis 47 located in eccentric or spaced relation from the axis 30 of the sub-series of centrally located openings 29 of the first conveyor element 13. The end eye 31 includes (see FIG. 2) an abutment area 51 located within a projection of the openings 29 of the sub-series of centrally located eyes 27.

While other arrangements can be employed, in the disclosed construction, the axis 47 of the opening 41 in the end eye 31 is preferably located in spaced or offset relation from the axis 30 of the openings 29 in the sub-series of centrally located eyes 27 at a short distance in the pitch direction or direction of travel 61 of the conveyer 11. If desired, as shown in FIG. 4, the axis 47 can also be located in spaced or offset relation from the axis 30 of the openings 29 in the sub-series of centrally located eyes 27 at a short distance in the direction 63 of chain or conveyor height, i.e., in the direction 63 perpendicular to the pitch direction or direction 61 of conveyor travel.

The offset in the pitch direction 61 prevents the hinge pin 17 from walking or migrating axially when the conveyor 11 is in either tension or compression. The offset in the direction 63 of conveyor height prevents the hinge pin 17 from walking or migrating axially when the conveyor 11 experiences height variations between adjacent links or elements 13 and 15.

The opening 43 in the end eye 33 has a diameter substantially equal to the diameter of the openings 29 in the eyes 27 of the centrally located sub-series and is located in axial alignment therewith.

The second conveyor element or link 15 can be fabricated of any suitable plastic, metallic, or other material and includes laterally spaced and generally rectilinearly extending sides 72, together with an end 71 located between the sides 72 and comprising a series of eyes 73 spaced axially or transversely from each other, extending into the spaces 25 between the eyes 23 of the first conveyor element or link 13, and defining therebetween another series of spaces 75 receiving the centrally located sub series of eyes 27 of the first conveyor element or link 13. The eyes 73 respectively include therein openings or bores 77 which are aligned with respect to each other and with respect to the openings 29 of the sub-series of centrally located eyes 27 of the first conveyor element or link 13, and which have a dimension or diameter substantially the same as the openings 29 of the centrally located sub-series of eyes 27 of the first conveyor link 13.

The hinge pin 17 can be fabricated of any suitable plastic, metallic or other material which is resiliently flexible and includes a central portion 81 which extends in the openings 29 of the sub-series of centrally located eyes 27 of the first conveyor element or link 13, and in the openings 77 of the eyes 73 of the second conveyor element or link 15, and which has a diameter only slightly less than the diameter of the openings 29 of the sub-series of centrally located eyes 27 of the first conveyor element or link 13.

In addition, the hinge pin 17 includes a first end portion 83 located adjacent the end eye 31 of the first conveyor element or link 13 and in interfering alignment with the abutment area 51 of the first end eye 31 of the first conveyor element or link 13. More particularly, while, other constructions can be employed, in the disclosed construction, the end portion 83 includes an enlarged head 85 which is of solid construction and which has a maximum diameter or dimension which is slightly less than the diameter of the opening 41 in the end eye 31, but which is greater than the diameter of the openings 77 in the eyes of the second conveyor link 15. Preferably, the enlarged head 85 is in the form or shape of an axially outwardly diverging cone which has the maximum diameter at the outer end thereof and, at the axially inner end thereof, merges into the diameter of the hinge pin central portion 81. Employment of the axially outwardly and diverging conical shape helps to provides a camming action to facilitate passage of the enlarged head 85 through the opening 41 in the end eye 31.

The hinge pin 17 also includes a second end portion 87 which is located in the opening 43 in the second end eye 33 of the first conveyor element or link 13, and which has a diameter equal to the diameter of the central portion 81 of the hinge pin 17.

In some instances, if the first conveyor element or link 13 is fabricated from sufficiently resilient material, then the hinge pin 17 need not be resilient. Conversely, if the hinge pin 17 is fabricated of sufficiently resilient material, then the first conveyor element or link 13 need not be resilient. Preferably, however, it is desirable that both the first conveyor element 13 and the hinge pin 17 be resilient.

In assembly of the conveyer 11, the first and second conveyor elements or links 13 and 15 are assembled with the centrally located eyes 27 of the first conveyor element or link 13 in the spaces 75 of the second conveyor element or link 15 and with the eyes 73 of the second conveyor element or link 15 in the spaces 25 of the first conveyor element or link 13 so as to locate the openings 29 and 77 in axial alignment. Thereafter, the end portion 87 of the hinge pin 17 is inserted through the opening 41 in the end eye 31 of the first conveyor element 13, through the openings 29 and 77 respectively located in the centrally located series of eyes 27 in the first conveyor element 13 and in the eyes 73 of the second conveyor element 15, and then through the opening 41 in the second end eye 33 of the first conveyor element 13. Because of the resilience of the first conveyor link 13 and/or the hinge pin 17, and notwithstanding the eccentricity or misalignment of the opening 41 in the end eye 31 with the openings 77 in the second conveyor link 15, such passage of the second end portion 87 into the second end eye 33 also serves to pass the end portion 83 of the hinge pin 17 through the end eye 31. When the hinge pin end portion 83 completes passage though the opening 41 in the end eye 31 of the first conveyor link 13, the resilience of the components causes realignment such that the enlarged head 85 of the hinge pin 17 is located in abutting alignment with the abutment area 51 of the end eye 31, thereby preventing hinge pin axial movement in the direction toward the end eye 31. At the same time, full insertion of the hinge pin end portion 83 through the opening 41 in the end eye 31 locates the inner end of the enlarged end portion 83 in close proximity to the adjacent eye 77 of the second conveyor link 15. Because of the increasing diameter of the conical shape of the enlarged head 85, axial movement of the hinge pin 17 in the axial direction toward the ene eye 33 is also prevented. Thus, the enlarged end portion 83 (located at only one end of the hinge pin 17) is effective, in the disclosed construction, to prevent axial movement of the hinge pin 17 in both axial directions.

As already indicated, such insertion of the hinge pin 17 into the recited openings is accomplished by bending or deflecting the hinge pin 17 and/or the first end eye 31 and is made possible by the resilience of the hinge pin 17 and/or the first conveyor element or link 13.

Accordingly, the use of the offset opening 41 in the first end eye 31 of the first conveyor element or link 13 prevents the hinge pin 17 from axially walking or moving in both axial directions and, accordingly, prevents disassembly of the connected conveyor elements or links 13 and 15. Furthermore, such prevention is accomplished without using additional parts other than the hinge pin 17 and one of the connected conveyor elements or links 13 and 15.

Shown in FIG. 5 is an other embodiment of a hinge pin 117 which is constructed identically to the hinge pin 17 already disclosed, except that, at the inner end of the enlarged end portion 183, the hinge pin 117 is provided with a shoulder 191 which extends perpendicularly to the hinge pin axis and which has an outer diameter greater than the diameter of the openings 77 in the second conveyor element or link 15.

Shown in FIG. 6 is an other embodiment of a hinge pin 217 which is constructed identically to the hinge pin 17 already disclosed, except that, the hinge pin 217 has a conically shaped enlarged end portion 283 which is provided with a axially extending slot 291 to provide two barbs 293 extending in spaced parallel relation to each other. Use of the disclosed barbs 293, permits partial collapse of the outer end of the enlarged end portion 283 to diminish the dimension at the outer end thereof so as to facilitate assembly of the enlarged end portion 283 of the hinge pin 217 through the opening 41 in the end eye 31. Accordingly, the non-collapsed dimension of the enlarged end portion 283 of the hinge pin 217 can be equal to or somewhat larger than the dimension or diameter of the opening 41 in the end eye 31. In a preferred form of the invention, the pin is made of a plastic material which has a memory such that the head of the pin can be deformed and will then return to its original shape.

In the disclosed construction, the enlarged spacing between the end eye 31 and the adjacent eye 77 of the centrally located sub-series of eyes 27 allows for visual inspection for proper assembly, cleanliness, and pin wear, and for easy access to afford disassembly when desired.

In addition, the disclosed construction does not require any special tool for assembly of the conveyor 11. Still further, the disclosed construction serves to physically block the hinge pin 17 against axial movement in two mutually perpendicularly related directions.

Various of the features are set forth in the following claims.

I claim:

1. A conveyor comprising a first conveyor element including a series of eyes spaced from each other, defining therebetween a series of spaces, and including a sub-series of centrally located eyes respectively including therein openings aligned with respect to each other, and an end eye adjacent one end of said sub-series of centrally located eyes and including therein an opening located in partial registry with said openings of said sub-series of centrally located eyes, and an abutment area adjacent said opening in said end eye, a second conveyor element fabricated of resilient material and including a series of eyes spaced from each other, extending into said spaces between said eyes of said first conveyor element, defining therebetween a series of spaces receiving said eyes of said central sub-series of eyes of said first conveyor element, and respectively including therein openings aligned with respect to each other and with respect to said openings of said centrally located sub-series of eyes, and having a dimension, and a hinge pin including a central portion extending in said openings of said sub-series of centrally located eyes of said first conveyor element and in said openings of said eyes of said second conveyor element, and an enlarged end portion located between said end eye of said first conveyor element and said eyes of said second conveyor element and in interfering alignment with said abutment area of said end eye of said first conveyor element and having a dimension greater than said dimension of said openings of said eyes of said second conveyor element.

2. A conveyor in accordance with claim 1 wherein said opening in said end eye of said first conveyor element has a dimension, and wherein said enlarged end portion has a dimension greater than said dimension of said openings in said eyes of said second conveyer element and lesser than said dimension of said opening in said end eye of first conveyer element.

3. A conveyor in accordance with claim 1 wherein at least one of said first conveyor element and said hinge pin is fabricated of resilient material.

4. A conveyor in accordance with claim 1 wherein both of said first conveyor element and said hinge pin are fabricated of resilient material.

5. A conveyor in accordance with claim 1 wherein said hinge pin and said first and second conveyor elements are fabricated of resilient material.

6. A conveyor in accordance with claim 1 wherein said second conveyor element has an end eye located adjacent said end eye of said first conveyor element and having an extent extending axially of said hinge pin, and wherein said space located between said end eye of said first conveyor element and said end eye of said second conveyor element has an extent extending axially of said hinge pin equal to approximately two times the axial extent of said end eye of said second conveyor element.

7. A conveyor in accordance with claim 1 wherein said end eye of said first conveyor element is spaced from said centrally located sub-series of eyes by a distance approximately equal to three times the space between said eyes of said central sub-series of eyes.

8. A conveyor in accordance with claim 1 wherein said end portion has a generally conical shape including an inner end located adjacent said central portion and an end remote from said central portion and having a dimension greater than said dimension of said openings of said eyes of said second conveyor element, and an outer end located remotely from said central portion and having a dimension larger than said dimension of said inner end and being passable through said opening in said end eye of said first conveyor element.

9. A conveyor in accordance with claim 1 wherein said second conveyor element has an end eye located adjacent said end eye of said first conveyor element, and wherein said end portion of said hinge pin has an axial length less than the axial spacing between said end eye of said second conveyor element and said end eye of said first conveyor element.

10. A conveyor in accordance with claim 1 wherein the spacing between said end eye of said second conveyor element and said end eye of said first conveyor element is greater than the spacing between said eyes of said sub-series of centrally located eyes.

11. A conveyor in accordance with claim 1 wherein said end portion of said hinge pin defines a shoulder located adjacent said central portion of said hinge pin and having a dimension greater than said dimension of said openings of said eyes of said second conveyor element.

12. A conveyor in accordance with claim 1 wherein said opening in said end eye of said first conveyor element has a dimension, and wherein said end portion of said hinge pin is axially outwardly diverging and conically shaped and includes an axially extending central slot defining two radially spaced barbs having a combined outer end with a dimension the same as or slightly greater than said dimension of said opening in said end eye of said first conveyor element.

13. A conveyor comprising a first conveyor element fabricated of resilient material and including an end comprising a series of eyes spaced from each other, defining therebetween a series of spaces, and including a sub-series of centrally located eyes spaced from each other at a given distance and respectively including therein openings aligned with respect to each other and having a dimension, and an end eye located adjacent one end of said sub-series of centrally located eyes and in axially spaced relation thereto at a distance approximately equal to three times the axial given distance between adjacent eyes of said sub-series of centrally located eyes and including therein an opening located in partial registry with said openings of said sub-series of centrally located eyes and having a dimension greater than said dimension of said opening in said end eye of said first conveyor element, and an abutment area located adjacent said opening of said end eye, a second conveyor element including an end comprising a series of eyes spaced from each other, extending into said spaces between said eyes of said first conveyor element, defining therebetween a series of spaces receiving said eyes of said central sub-series of said eyes of said first conveyor element, and including an end eye, and openings located in each of said series of eyes of said second conveyor element, being aligned with respect to each other, and having a dimension substantially equal to said dimension of said opening in said end eye of said first conveyor element, and a hinge pin fabricated of resilient material, having an axial length less than the axial spacing between said end eye of said second conveyor element and said end eye of said first conveyor element and including a central portion extending in said openings of said sub-series of centrally located eyes of said first conveyor element and in said openings of said eyes of said second conveyor element, and an enlarged end portion located between said end eye of said first conveyor element and said end eye of said second conveyor element and having an axially outwardly diverging conical shape including an inner end located adjacent said central portion and having a dimension greater than said dimension of said openings of said eyes of said second conveyor element, and an outer end located remotely from said central portion and located in interfering alignment with said abutment area of said end eye of said first conveyor element.

14. A conveyor in accordance with claim 13 wherein said end portion of said hinge pin includes an axially outer end having a dimension slightly less than said dimension of said opening in said end eye of said first conveyor element.

15. A conveyor in accordance with claim 13 wherein said end portion of said hinge pin includes an axially extending central slot defining two radially spaced barbs.

16. A conveyor in accordance with claim 15 wherein said barbs have a combined outer end with a dimension the same as or slightly greater than said dimension of said opening in said end eye of said first conveyor element.

17. A conveyor in accordance with claim 13 wherein said end portion of said hinge pin includes an inner end which is located adjacent said end eye of said second conveyor element and which defines a shoulder located adjacent said central portion of said hinge pin and having a dimension greater than said dimension of said openings of said eyes of said second conveyor element.

18. A conveyor in accordance with claim 13 wherein said second first conveyor element is also fabricated of resilient material.

* * * * *